Figure 1:
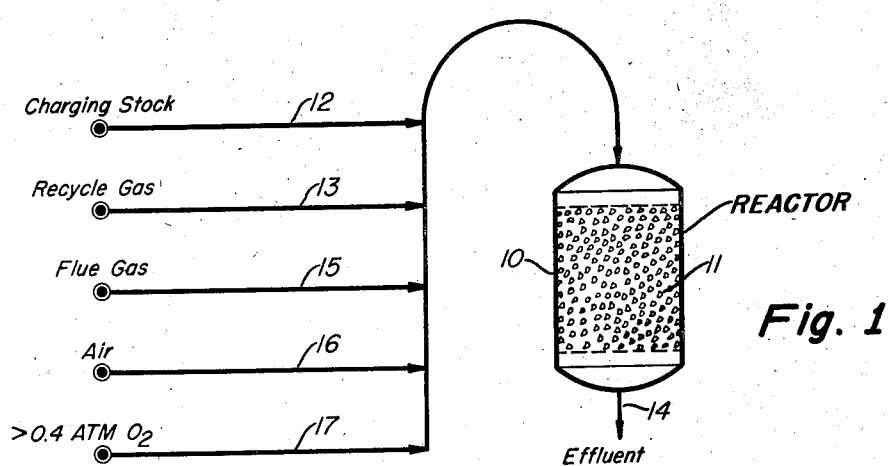

Sept. 23, 1958  B. L. EVERING ET AL  2,853,435
REJUVENATION OF PLATINUM CATALYSTS AFTER
DEACTIVATION IN A HIGH TEMPERATURE
HYDROCARBON CONVERSION PROCESS
Filed June 12, 1953  3 Sheets-Sheet 1

INVENTORS:
Bernard L. Evering
John R. Coley
William A. Wilson
BY
Everet J. Smith
ATTORNEY INVENTORS:
Bernard L. Evering
John R. Coley
William A. Wilson
BY Everet F. Smith
ATTORNEY / 2,853,435
Patented Sept. 23, 1958

2,853,435

REJUVENATION OF PLATINUM CATALYSTS AFTER DEACTIVATION IN A HIGH TEMPERATURE HYDROCARBON CONVERSION PROCESS

Bernard L. Evering, Chicago, Ill., John R. Coley, Gary, Ind., and William A. Wilson, Park Forest, Ill., assignors to Standard Oil Company, Chicago, Ill., a corporation of Indiana Application June 12, 1953, Serial No. 361,348

6 Claims. (Cl. 196—50)

This invention relates to platinum catalysts, and more particularly to the rejuvenation of platinum catalysts after deactivation in a high-temperature hydrocarbon-conversion process.

Platinum catalysts have been employed in the past to promote a variety of reactions. More recently, supported platinum catalysts have been employed for the reforming of naphthas and the conversion thereof into gasoline stocks of improved antiknock rating. When used for this purpose, such catalysts are capable of making products of excellent quality in high yields. Moreover, when the reforming process is carried out in the presence of hydrogen at pressures of the order of 500 pounds per square inch and higher, the catalyst maintains its activity over an on-stream period of weeks or even months, depending upon the nature of the charging stock and the severity of the treatment employed. Ultimately, however, the catalyst drops in activity and selectivity to such an extent as to require some form of reactivation, such as by burning off the accumulated carbon in an oxygen-containing atmosphere, followed by a further treatment in oxygen at high temperature. Under appropriate conditions of time, temperature, and oxygen partial pressure, such a reactivation procedure is ordinarily capable of restoring the catalyst substantially to its initial levels of activity and selectivity. When, however, the catalyst has been exposed to contact with sulfur, sulfur-containing compounds, or other sulfur bodies, ordinarily as components of the charging stock, it becomes much more rapidly and severely deactivated, and none of the techniques heretofore disclosed in the art are capable of overcoming the effects of the sulfur or sulfur compounds and producing the required degree of reactivation.

We have now found that sulfur-deactivated platinum catalysts can be effectively reactivated by a method which comprises the steps of burning carbon from the catalyst, treating the catalyst with hydrogen at elevated temperature, and soaking the catalyst in an oxygen-containing atmosphere at elevated temperature. Thus, our new method is an outgrowth of the two-step oxidative regeneration-rejuvenation method referred to above, but includes the additional step of hydrogen-treating the catalyst between the two oxygen treatments.

Our invention has, as its objects, to improve the reforming of hydrocarbons, especially sulfur-containing naphthas, to reactivate platinum catalysts after the said catalysts have become deactivated in the treatment of sulfur-containing charging stocks, and to increase the useful life of platinum catalysts.

In one aspect, our invention may be considered to be a cyclic hydroforming process which includes the following steps:

(1) A sulfur-containing charging stock, such as a West Texas virgin naphtha, is contacted under hydroforming conditions in a hydroforming zone at a temperature between about 850 and 1000° F., a pressure of 50 pounds per square inch gage or higher, a hydrogen partial pressure of 30 pounds per square inch or higher, and a liquid hourly space velocity between about 0.5 and 10 or higher with a catalyst consisting essentially of pure alumina impregnated with between about 0.1 and 1 percent by weight of platinum, whereby the catalyst becomes gradually deactivated through accumulation of carbon and sulfur, through destruction of the active catalytic centers, and through other mechanisms not well understood.

(2) After the catalyst has reached an objectionable degree of deactivation, it is withdrawn from the on-stream hydroforming conditions; and after a preliminary purge with an inert gas, the catalyst is regenerated by burning carbon and sulfur therefrom with air or other oxygen-containing gas at a controlled temperature below the sintering point of the catalyst, suitably between about 825 and 1300° F., and preferably below about 1200° F. Most of the carbon is readily removed in this way, and most of the sulfur and sulfur compounds are converted into sulfur oxides. It appears, however, that at least a portion of the sulfur, organic sulfur compounds, and/or sulfur oxides are retained in or on the catalyst, where they give rise to difficulties in the prior-art catalyst rejuvenation methods.

(3) The resulting carbon- and sulfur-depleted catalyst is contacted with hydrogen at elevated temperature until the evolution of sulfur compounds therefrom substantially ceases. For this purpose, hydrogen at atmospheric or elevated pressures can be used, but we prefer to operate under conditions of temperature and pressure within the general ranges employed in the hydroforming operation itself. Thus, we may employ hydrogen at a pressure between about 50 and 1000 pounds per square inch gage, and we may expose the catalyst to contact therewith at a temperature between about 850 and 1100° F. Substantially lower and higher temperatures may also be used without departing from the spirit of our invention, e. g. from about 650° F. to about 1300° F. or to a maximum just below the sintering point of the catalyst. The hydrogen treating time will vary substantially, depending upon the nature and concentration of the sulfur compounds present in or on the catalyst. Ordinarily, however, a mildly deactivated catalyst is sufficiently treated after about 0.25 to 24 hours, and treating times greatly in excess of such a period can be employed without harm to the catalyst.

(4) The hydrogen-treated catalyst is rejuvenated by again contacting it with air or other gas containing oxygen under conditions within the range suitable for the regeneration step 2, described above, suitably at a temperature above about 825° F. but below the sintering point of the catalyst, ordinarily below about 1300° F., for a period of time sufficient to restore the catalyst substantially to its original state of activity, selectivity, and catalytic stability. The rejuvenation treatment is preferably carried out with oxygen or a gas containing oxygen at a partial pressure above 0.4 atmosphere, at a total pressure within the normal hydroforming range of 50 to 1000 pounds per square inch gage, and a temperature between about 900 and 1100° F., for a period of time between about one and twenty-four hours.

(5) The rejuvenated catalyst is finally purged with an inert gas, and is returned directly to the hydroforming phase of the process, where it receives a sufficient contact with hydrogen, contained in the recycle gas, to restore the catalytically active centers. Alternatively, before the catalyst is returned to the hydroforming zone, it can otherwise be exposed to contact with hydrogen in a separate treating zone at a temperature within the general range suitable for use in the hydrogen treatment of step 3, described above.

In another aspect, our invention is a reactivation procedure, applicable to the treatment of sulfur-deactivated platinum catalysts, which comprises the steps of regenerating, hydrogen-treating, and rejuvenating, defined hereinabove as steps 2, 3, and 4, respectively.

In another aspect, our invention is an improvement in the oxidative method for regenerating and rejuvenating a deactivated platinum catalyst, the said improvement comprising the step of hydrogen-treating the catalyst (as described in step 3 above) between the steps of regenerating and rejuvenating, and the said improvement being especially applicable in the treatment of sulfur-deactivated platinum catalysts.

The mode of action whereby sulfur, hydrogen sulfide, organic sulfur compounds, and sulfur oxides cause deaction of platinum catalysts is obscure, and it is likewise uncertain how the said deactivation is overcome by the new technique which we have now developed. We have found, for example, that the addition of hydrogen sulfide to an otherwise substantially sulfur-free charging stock during a typical hydroforming operation employing a platinum catalyst produces an accelerated loss in catalyst activity. This effect is not readily explainable, in view of the fact that platinum hydroforming catalysts are ordinarily prepared by combining a supporting material such as alumina with platinum in the form of the sulfide. We have further observed that hydrogen sulfide-deactivated platinum catalysts are not fully responsive to simple oxidative regeneration and rejuvenation in situ according to the technique described above, possibly because the reactor walls tend to accumulate a loose coating of metal sulfide scale, which readily releases sulfur as oxides in damaging quantities; moreover, catalysts treated in this way are much more sensitive to the action of hydrogen sulfide than fresh catalysts. Sulfur dioxide also exerts a poisoning effect upon platinum catalysts somewhat similar in nature to the effect of hydrogen sulfide; and a mixture of sulfur dioxide and oxygen, when passed over a platinum catalyst at a temperature within the hydroforming range, rapidly produces virtually complete deactivation of the catalyst and converts most or all of any alumina present therein to the sulfate. Our study of this problem indicates that sulfur compounds should largely be removed from the catalyst structure and environment before the catalyst is subjected to the second oxygen treatment (herein termed "rejuvenation") normally required to restore the catalyst to its original catalytic properties. In pursuance of this end, we have further found that sulfur compounds can be removed to some extent by hydrogen treatment at virtually any stage of the reactivation procedure, but that sulfur compounds are removed much more readily and completely by a sweeping hydrogen treatment between the steps of regeneration and rejuvenation, under the conditions heretofore described. When treating a heavily sulfided catalyst, it is advantageous to employ a succession of hydrogen and oxygen treatments under the conditions described above in order to effect a substantially complete removal of sulfur bodies from the catalyst and from the treating zone.

Sulfur and sulfur compounds are objectionable in any concentration in charging stocks for platinum-catalyst hydroformers. In low concentrations, i. e. around 0.01 to 0.1 percent by weight calculated as elemental sulfur, the poisoning effects thereof are not immediately apparent; but the effects are cumulative, and ultimately become objectionable during extended runs, especially runs at low pressures around 50 to 350 pounds per square inch gage and runs employing recycle hydrogen-containing gas without provisions for removing sulfur compounds therefrom. At higher charging-stock sulfur levels, catalyst deactivation is more rapid and more serious, until at levels of 0.5 percent by weight and higher the effective on-stream time is so short that a reactivation procedure must be employed at frequent intervals. Under these conditions, our rejuvenation process is highly successful in maintaining the catalyst at a high level of activity and selectivity with a minimum of lost time.

Figure 2:
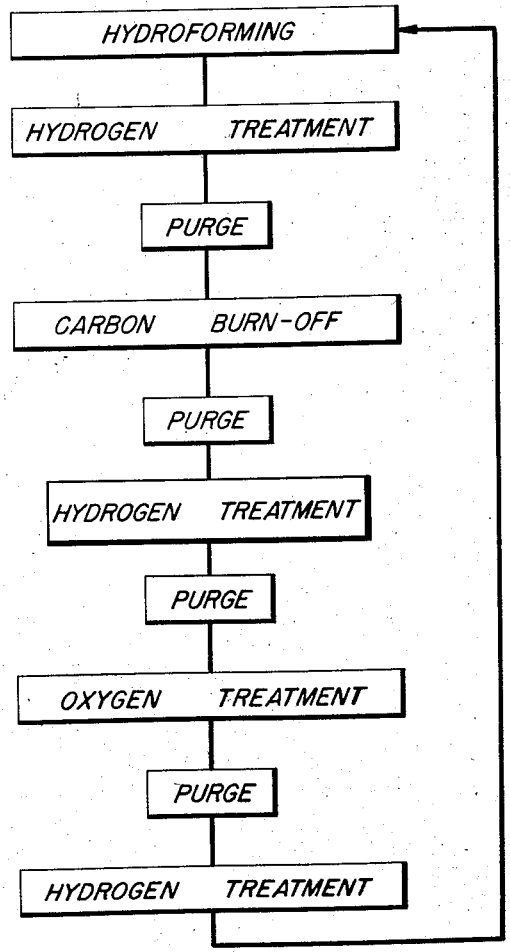

Figure 1 illustrates a simple embodiment of our invention employing a fixed-bed reactor 10, containing a pelleted platinum catalyst 11, of the type described elsewhere herein. The cycle of process steps is set forth diagrammatically in Figure 2, which may conveniently be followed in connection with the following description thereof.

A West Texas naphtha or other charging stock containing around 0.05 to 1.0 percent by weight or more of sulfur in the form of sulfur compounds is vaporized and superheated, and the vapors are led through line 12 into the top of reactor 10, together with a recycle gas stream comprising ordinarily about 80 percent hydrogen, supplied through line 13. The mixture of charging stock and recycle gas flows downward through the catalyst bed, where it undergoes the various hydroforming reactions at a temperature preferably between about 850 and 1000° F., a pressure between about 50 and 350 pounds per square inch gage, preferably around 200 to 300 pounds per square inch, a hydrogen partial pressure between about 30 and 250 pounds per square inch, a hydrogen rate of 2,000 to 10,000 standard cubic feet per barrel of charging stock, and an hourly weight-space velocity of 0.5 to 10. The reaction product emerges from the bottom of the reactor, and is conveyed through line 14 to suitable separation equipment, not shown, for the segregation and separation of the liquid hydroformate and non-condensible gases. The said gases may be recycled totally or in part to the reactor, as required to maintain the desired recycle gas rate. Prior to being recycled, the gases may optionally be purified by contact with an aqueous amine solution, an aqueous alkali, an absorber oil, silica gel, activated charcoal, activated alumina, or the like, to remove sulfur compounds and other impurities therefrom.

During the hydroforming operation, carbon and sulfur compounds are deposited on the catalyst and on the reactor walls, and the catalyst slowly declines in activity and selectivity. After the catalyst has deteriorated to an objectionable extent, the flow of charging stock to the reactor is stopped, and the reactor is purged of charging stock by continuing the flow of recycle gas under the hydroforming conditions of temperature and pressure, the catalyst being simultaneously hydrogen-treated thereby. Thereafter, the recycle gas is stopped, and the reactor is purged of hydrogen by means of flue gas, introduced through line 15. After the purge has been completed, air is introduced through line 16 into the flue-gas stream to an oxygen level up to about 2 percent, the resulting gas mixture is adjusted to a temperature suitably between about 700 and 800° F. at the reactor inlet, and carbon and sulfur are burned thereby from the catalyst in a combustion front that moves from the top to the bottom of the catalyst bed. The oxygen concentration, the inlet gas temperature, and the gas flow rate are adjusted to hold the maximum temperature of the combustion front between about 825 and 1300° F., preferably below about 1200° F. The accessible carbon and sulfur deposits in the catalyst and on the reactor walls are ordinarily substantially completely oxidized in a total burn-off time of about 2 to 5 hours. The appearance of free oxygen in the flue gas leaving the reactor is a convenient indication of the substantial completion of the oxidation; we prefer, however, to continue the flow of oxidizing gas for an additional short time until a substantial proportion, e. g. approximately half, of the initial oxygen content thereof appears in the effluent gas.

The foregoing burn-off treatment is ineffective by itself for restoring the activity and selectivity of the catalyst to the original levels prior to deactivation. Moreover, the sulfur-deactivated catalyst cannot be successfully rejuvenated by a further oxidation, even under the more severe conditions disclosed by Glenn M. Webb in his copending application Serial No. 292,275, filed June 7, 1952, now abandoned. We have found that an intermediate hydrogen treatment is necessary between two oxidation steps in order to permit effective rejuvenation. After the carbon burn-off step has been completed, the catalyst is purged with flue gas, introduced through line 15, and hydrogen, recycle gas, or other hydrogen-containing gas is passed through the reactor at a temperature between about 650 and 1300° F., preferably around 850 to 1100° F.; a pressure of about 1 atmosphere or higher, and a flow rate high enough to produce at least a small net efflux of gas, sufficient to carry away the impurities driven away from the catalyst. During the said hydrogen treatment, sulfur is evolved from the catalyst in the form of sulfur dioxide, hydrogen sulfide, and possibly to some extent as elemental sulfur and organic sulfur compounds. The removal of labile sulfur is ordinarily complete within a treating time of about 1 to 5 hours, the required time varying substantially in accordance with the extent of sulfur contamination, the treating temperature, the hydrogen partial pressure, the gas flow rate, and the accessibility of the catalyst surfaces. The treatment with hydrogen is preferably continued until the effluent gas stream is substantially free of sulfur and sulfur compounds.

At the end of the hydrogen treatment described above, the reactor is again purged with flue gas (line 15) and is subjected to rejuvenation by contacting at elevated temperature in oxygen, introduced through line 17. In this treatment we ordinarily employ a stream of oxygen, either pure or diluted with an inert gas such as nitrogen, at a temperature between about 825 and 1300° F., preferably 900 to 1100° F., and an oxygen partial pressure of at least about 0.4 atmosphere, preferably about 0.4 to 4 atmospheres. We find it convenient to employ air for this purpose at the pressure utilized in the hydroforming process, and to preheat the air by adding thereto a fuel gas such as natural gas, propane, butanes, or the like in a suitable auxiliary combustion zone. Where there is evidence of the continued presence of sulfur bodies in the catalyst or reactor, it is desirable to carry out the second oxidative treatment under somewhat milder conditions (e. g. a temperature from 50 to 100° F. or more lower than in the first oxidative treatment) in order to minimize the conversion of such sulfur bodies into sulfur oxides. During a soaking period of about 1 to 5 hours, the carbon and sulfur content of the catalyst is further reduced, residual sulfur compounds are swept out of the reactor, and the catalyst metal is changed in a manner not fully understood so that it is restored to substantially its initial catalytic properties, either immediately or on subsequent contact with hydrogen.

After the oxygen treatment has been carried to the desired extent, the introduction of oxygen into the reactor is discontinued, the catalyst is purged free of oxygen with flue gas (line 15) while simultaneously being adjusted to the desired hydroforming temperature, and the catalyst is finally exposed to hydrogen treatment at hydroforming temperature and pressure for a period of around 0.1 to 1 hour, after which the hydroforming operation is resumed. The final hydrogen treatment, it will be noted, can satisfactorily be carried out as a feature of the hydroforming operation itself, through the action of hydrogen contained in the recycle gas stream.

Figure 3:
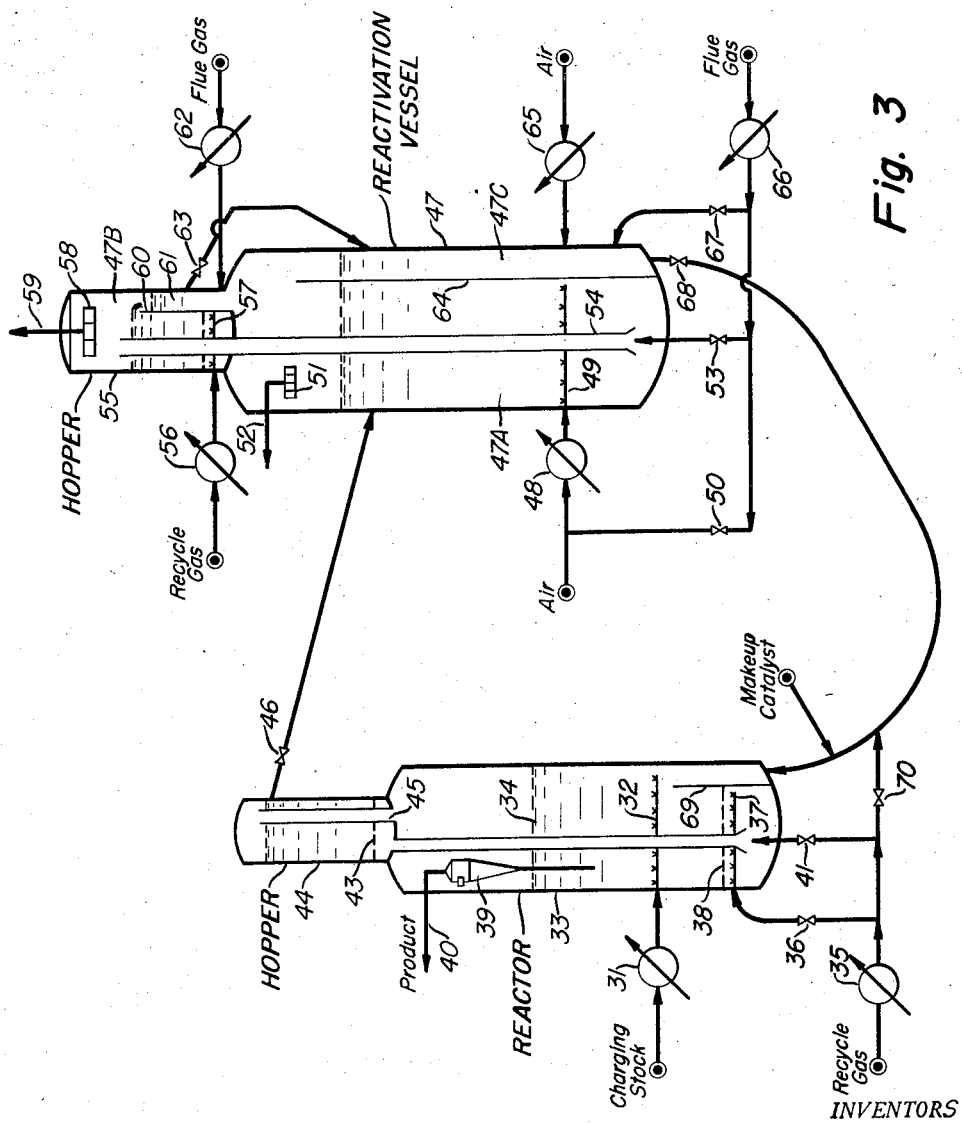

Figure 3 is a schematic illustration of an embodiment of our invention in a fluidized catalyst system with a rejuvenation vessel of special design. A sulfur-containing charging stock is vaporized in heater 31 and introduced through sparger pipe 32 into a lower part of reactor 33. The reactor is filled to a suitable level with finely divided catalyst 34 of such particle size as to permit satisfactory fluidization, suitably distributed in the range of 1 to 200 microns. The catalyst may be platinum-alumina, platinum on silica-alumina, platinum-titania-alumina, or the like, as described elsewhere herein. The catalyst is fluidized by means of the vaporized charging stock and by means of recycle gas, predominantly hydrogen, introduced into the reactor through heater 35, valved line 36, sparger pipe 37, and grating 38. The recycle gas is preferably heated in heater 35 to a temperature 50 to 150° F. higher than the average hydroforming temperature in reactor 33, in order to supply a portion of the heat required by the endothermic hydroforming reactions. The recycle gas also serves to strip hydrocarbons from the catalyst in the lower part of the reactor, prior to withdrawal of the catalyst for reactivation. The hydroforming process is carried out at a temperature between about 850 and 1000° F., a pressure between about 50 and 350 pounds per square inch, preferably around 200 to 300 pounds per square inch, a hydrogen rate of 2,000 to 10,000 standard cubic feet per barrel of charging stock, an hourly weight-space velocity of 1 to 10, a catalyst-to-oil ratio between about 0.001 and 10, and an average holding time for the catalyst within the reactor between about 0.1 and 100 hours, preferably 0.2 to 20 hours. The vaporous reaction products pass from the reactor through cyclone system 39 and line 40 to a conventional recovery system (not illustrated), an important feature of which is the separation, purification, and return of the product gas (largely hydrogen) as recycle gas to various indicated points in the process.

Catalyst is withdrawn continuously from reactor 33 at a rate adjusted to give the desired holding time in the reactor, to keep the catalyst activity and selectivity at the desired level, and to produce an average coke level on the catalyst particles as withdrawn from the reactor ordinarily in excess of 0.1 percent by weight but preferably less than about 2 percent. Withdrawal is effected by gas-lift from the bottom of the reactor, employing a stream of recycle gas which flows through line 41 into the bottom of riser 42 and upward, carrying with it a quantity of catalyst through grating 43 into hopper 44. Within the riser and the hopper, the catalyst is subjected to a treatment with hydrogen under substantially the conditions of temperature and pressure employed in the hydroforming operation itself, whereby a portion of the sulfur compounds contained in and on the catalyst are driven off and carried away with the gas stream. The catalyst is disengaged from the gas within the hopper, and the gas stream is led through downcomer 45 to the free space at the top of the reactor, where it combines with the hydroformer product mixture.

The hydrogen-treated catalyst overflows from hopper 44 through valved line 46 into reactivation vessel 47, which comprises a regeneration zone 47A, a hydrogen-treating zone 47B, and a rejuvenation zone 47C. Within regeneration zone 47A, the catalyst is fluidized and contacted with a dilute oxygen stream, preferably at a temperature and pressure substantially the same as the temperature and pressure employed in the hydroforming zone, whereby carbon and sulfur are burned therefrom. The regenerating gas, introduced through heater 48 and sparger pipe 49, is a mixture of flue gas (supplied through valved line 50) and air, containing a small controlled proportion of oxygen, suitably around 2 percent. The temperature within regeneration zone 47A is readily maintained at the desired level by appropriate regulation of the regeneration gas temperature, flow rate, and oxygen concentration. Flue-gas leaves the regeneration zone through ceramic filters 51 and line 52.

Treated catalyst, ordinarily containing less than about 0.05 percent by weight of residual carbon and traces of sulfur in various forms, is withdrawn continuously by gas-lift from the bottom of the regeneration zone, employing a stream of flue gas, which flows through valved line 53 into the bottom of riser 54 and upward, carrying with it a quantity of catalyst into hopper 55, which functions as a hydrogen-treating zone. Within the hopper the catalyst is treated with a hydrogen-containing gas, suitable recycle gas, introduced into the bottom of the hopper through heater 56 and sparger pipe 57. The hydrogen treatment is preferably carried out at a temperature between about 850 and 1100° F. and a total pressure between about 50 and 350 pounds per square inch, optimally at the temperature and pressure employed in the hydroforming zone, for an average holding time sufficient to volatilize substantially all of the hydrogen-labile sulfur compounds associated with the catalyst. Ordinarily a contact time of 0.1 to 10 hours is sufficient for this purpose. The various gases entering hopper 55 and the vaporized sulfur compounds evolved therein are disengaged from the catalyst within the hopper and emerge therefrom through ceramic filters 58 and line 59.

Hydrogen-treated catalyst within hopper 55 overflows baffle 60 into stripping zone 61, where it is stripped of hydrogen by means of hot flue gas, supplied through heater 62. The stripped catalyst flows through valved line 63 into rejuvenation zone 47C, which is separated from regeneration zone 47A by means of baffle 64. Within the rejuvenation zone, the catalyst is contacted with oxygen at a temperature between about 825 and 1300° F., preferably 900 to 1100° F., a pressure of 50 to 350 pounds per square inch, equal to that in regeneration zone 47A, an oxygen partial pressure preferably around 0.4 to 4 atmospheres or more, and an average holding time between about 0.1 and 36 hours, preferably 1 to 4 hours, varying inversely with the temperature employed. The oxygen-containing gas enters rejuvenation zone 47C through heater 65. This gas is air or oxygen, or air enriched with oxygen, and a hydrocarbon or other combustible vapor may be added if desired as a supplemental heat source. The spent gas emerging from the top of the rejuvenation zone commingles with the gas from the regeneration zone and is vented through ceramic filters 51 and line 52. The rejuvenated catalyst, ordinarily containing less than 0.01 percent carbon and a negligible proportion of sulfur, is stripped with hot flue gas, introduced near the bottom of rejuvenation zone 47C through heater 66 and valved line 67, and the stripped catalyst is withdrawn through valved line 68 and recycled to reactor 33. The temperature of the recycled catalyst is regulated by a suitable adjustment of conditions in rejuvenation zone 47C to a level from 50 to 150° F. or more above the average hydroforming temperature as a means of supplying a part of the heat required by the endothermic hydroforming reactions. The recycled catalyst is introduced into a lower portion of reactor 33, segregated by baffle 69, wherein it is fluidized and hydrogen-treated by recycle gas flowing through valved line 70, and is commingled thereby with the main body of the catalyst within the reactor. Baffle 69 may be extended if desired to the top of the dense-phase catalyst bed, or an equivalent internal or external conduit may be substituted therefor. Makeup catalyst is supplied as required to the recycle catalyst line.

In the treatment of catalyst with oxygen-containing gases, it is important to regulate the treating conditions so as to avoid excessive temperatures which might cause deactivation or destruction of the catalyst through sintering or other mechanisms not readily explainable in the present state of the art. For this reason, it is important to correlate the catalyst carbon level, sulfur level, the oxygen content of the gas streams, the input gas temperature, the input gas rate, and the effectiveness of any auxiliary cooling means to hold the catalyst temperature to a level below the temperature at which sintering of the platinum or of the catalyst support takes place, preferably below about 1300° F. and optimally below about 1200° F.

Our process is broadly suitable for the reactivation of platinum-containing hydroforming catalyst. Such catalysts ordinarily contain between about 0.1 and 1 percent by weight of platinum, preferably about 0.6 percent, supported on alumina, silica-alumina, or alumina plus a third component, such as a fluoride, a chloride, boria, titania, chromia, an oxide of phosphorus, vanadia, or the like. Such third components are commonly employed in the proportion of about 0.1 to 10 percent by weight, based on dry $Al_2O_3$. Catalysts of this type are capable, when freshly prepared, of upgrading a 400° F. end-point Mid-Continent virgin naphtha having a CFR–R octane number below 50 to a 400° F. end-point 10-pound Reid vapor pressure product having a CFR–R octane number above 90 in a yield above 90 percent by volume. In the preparation of such a catalyst, a mixture of platinum and alumina is prepared and the mixture is dried and calcined. The alumina may be any of a large variety of forms known to the art, but should preferably be substantially free from contaminating metals having an adverse effect upon the hydroforming reactions. The alumina is commingled with platinum in the form of chloroplatinic acid, platinum tetrachloride, or other platinum compound or solution thereof, or preferably as a stable colloidal suspension of a platinum sulfide, suitably prepared by commingling aqueous ammonium polysulfide with aqueous chloroplatinic acid. To this mixture is added any desired third component of the class described above, or a substance affording such a component under the conditions employed in the catalyst preparation. The mixture of catalyst components is optionally dried in part, suitably at a temperature between about 200 and 400° F. for a period between about 4 and 24 hours, and is then calcined at a temperature between about 800 and 1200° F. for around 2 to 8 hours or more. The catalyst can be prepared in any of the usual mechanical forms. Either before or after calcination, it can be broken into lumps or granules, or pulverized for use in the suspensoid or fluidized-solids processes. Alternatively, it can be formed into pills, pellets, or other suitable shapes, preferably prior to the calcination step. In this case, the partially dried catalytic mixture is ground to a powder, preferably small enough to pass through a 30-mesh screen, a suitable lubricant is added, such as stearic acid, rosin, hydrogenated coconut oil, graphite, or the like, and the mixture is shaped by extrusion, compression in a pilling machine, or otherwise according to methods well known in the art. Pills having dimensions ranging from about 1/8" x 1/8" to 1/2" x 1/2" are satisfactory for most purposes. The shaped masses can then be calcined or otherwise treated as set forth above.

Our invention will be more fully understood from the following specific examples:

*Example 1*

The following tests were carried out to study the deleterious effects of $SO_2$ in gases employed for catalyst regeneration, and to demonstrate the ability of our invention to overcome such effects.

The tests were carried out in a fixed-bed isothermal reactor of 50-milliliter catalyst capacity, using an alumina-based catalyst containing 0.6 percent by weight of platinum, based on dry $Al_2O_3$. The catalyst was prepared by commingling a Heard-type alumina hydrosol, described in Reissue Patent 22,196 (October 6, 1942), with a colloidal suspension of platinum sulfide, obtained by commingling aqueous solutions of chloroplatinic acid and ammonum polysulfide, and thereafter drying, calcining, crushing, forming into 1/8-inch pellets, and again calcining, as described elsewhere herein. The charging stock was a typical Mid-Continent virgin naphtha having the following inspections:

ASTM Distillation, ° F.:
  Initial _____ 200
  10 _____ 237
  20 _____ 246
  30 _____ 254
  40 _____ 262
  50 _____ 272
  60 _____ 281
  70 _____ 290
  80 _____ 299
  90 _____ 313
  Max. _____ 360
Octane No., CFR–R _____ 43.8
Gravity, ° API _____ 56.5

R. V. P. ............................................ 1.8
Sulfur, wt. percent ............................. 0.03
Analysis, vol. percent:
    Paraffins ..................................... 52
    Naphthenes ................................. 40
    Aromatics .................................... 8
    Olefins ....................................... 0

The hydroforming operations were uniformly carried out at 200 pounds per square inch gage, 2.0 volume hourly space velocity, 965° F. block temperature (the temperature of a heat-distributing metallic block surrounding the reaction zone), 930–935° F. average catalyst temperature, and 4,000–5,000 standard cubic feet of once-through hydrogen per barrel of charging stock. A hydroforming activity test on the fresh catalyst, carried out under the above conditions, gave the following results:

Product interval:         Octane No., CFR–R
    0–5 hours ................................... 96.9
    5–20 hours .................................. 96.4
    20–35 hours ................................ 98.2
    35–50 hours ................................ 96.8
    50–65 hours ................................ 95.6
    65–80 hours ................................ 95.3
    80–95 hours ................................ 95.2
    95–110 hours .............................. 94.4

A fresh batch of catalyst was treated 5 hours at 1080° F. and 300 pounds per square inch with a stream of synthetic flue gas containing 0.2 percent $SO_2$, 2 percent $O_2$, 0.2 percent CO, 20 percent $CO_2$, 10 percent $H_2O$, and 67.6 percent $N_2$. The treated catalyst was given a hydroforming life test under the conditions defined above, with the following results:

Product interval:         Octane No., CFR–R
    0–5 hours ................................... --
    5–25 hours .................................. 93.0
    25–45 hours ................................ 92.4
    45–65 hours ................................ 92.1
    65–85 hours ................................ 92.4
    85–105 hours .............................. 91.5

The above-described cycle of flue-gas treatment and hydroforming life test was carried out repeatedly; and after the fifth flue-gas treatment, the left test indicated that the catalyst had suffered a substantial loss in activity and a severe loss in activity maintenance:

Product interval:         Octane No., CFR–R
    0–5 hours ................................... 92.3
    5–25 hours .................................. 90.7
    25–45 hours ................................ 89.6
    45–65 hours ................................ 87.8
    65–85 hours ................................ 85.9
    85–105 hours .............................. 78.4

The catalyst was thereupon subjected to a two-step oxidative regeneration-rejuvenation treatment in an effort to restore its catalytic properties. In the first oxidation, the catalyst was burned free of carbon by exposure to air at 200 pounds per square inch gage and a reactor block temperature of 965° F. The resulting combustion front had a temperature of 1080° F. and required approximately one hour to pass completely through the catalyst bed. The catalyst was thereafter soaked for 16 hours in a stream of air at 200 pounds per square inch gage and 1000° F. A hydroforming life test indicated that the catalyst was further deactivated, rather than improved, by the foregoing procedure:

Product interval:         Octane No., CFR–R
    0–5 hours ................................... 87.8
    5–25 hours .................................. 81.5
    25–45 hours ................................ 77.2
    45–65 hours ................................ 74.0
    65–85 hours ................................ 73.3
    85–105 hours .............................. 73.2

At the end of the foregoing test, the catalyst was subjected to a reactivation treatment according to our invention. The catalyst was first burned substantially free of carbon in a stream of air at 200 pounds per square inch gage, 875° F. block temperature, and 980° F. combustion front temperature, about one hour being required. Thereafter, the catalyst was contacted with 4.5 standard cubic feet of hydrogen per hour at 950° F. and 200 pounds per square inch gage for 8 hours, and finally the catalyst was contacted with air at 1000° F. and 200 pounds per square inch gage for 16 hours. A hydroforming life test under the defined conditions demonstrated that the catalyst had been restored substantially to its original activity and stability:

Product interval:         Octane No., CFR–R
    0–5 hours ................................... 98.9
    5–25 hours .................................. 95.8
    25–45 hours ................................ 96.9
    45–65 hours ................................ 96.0
    65–85 hours ................................ 93.8
    85–105 hours .............................. 93.0

*Example 2*

The following tests were carried out on a naphtha hydroforming process to study the effect of hydrogen sulfide on a supported platinum catalyst.

Figure 4:
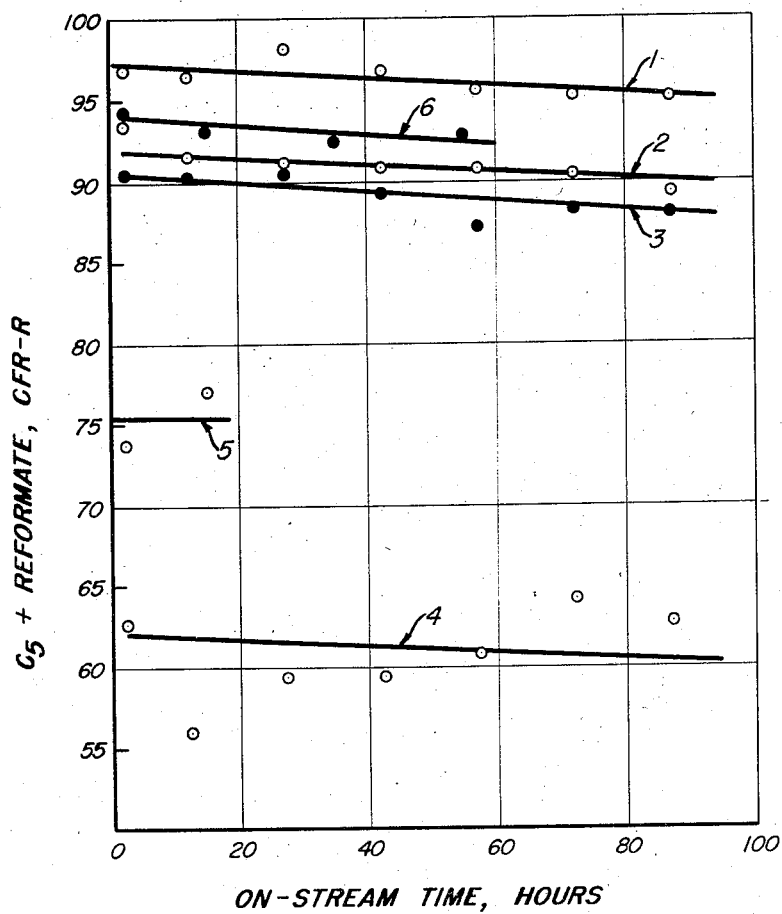

The reaction vessel, charging stock, catalyst composition, and hydroforming conditions were identical to those employed in Example 1. To the naphtha was added 0.5 weight-percent of sulfur in the form of hydrogen sulfide to simulate the degree of exposure of the catalyst to sulfur in a conventional gas-recycle operation without sulfur removal from the recycle gas. The sulfur-containing naphtha was subjected to hydroforming over a fresh batch of catalyst under the defined hydroforming conditions. The results are given in the following table and in curve 2 of the attached graph, Figure 4, where the CFR–R octane numbers of the $C_5+$ reformate fractions are plotted against on-stream time. For comparison, Figure 4 includes a base curve (curve 1), plotted from data reported in Example 1, showing the activity-time relationship of the same catalyst when used to treat the same charging stock without hydrogen sulfide addition.

Product interval:         Octane No., CFR–R
    0–5 hours ................................... 93.5
    5–20 hours .................................. 91.6
    20–35 hours ................................ 91.2
    35–50 hours ................................ 90.8
    50–65 hours ................................ 90.7
    65–80 hours ................................ 90.4
    80–95 hours ................................ 89.2

At the end of approximately 95 hours on stream, the run was stopped, and the catalyst was purged, cooled, and withdrawn from the reactor. The catalyst was burned free of carbon by exposure to air at 1 atmosphere for 6 hours in a muffle furnace at 825° F.; then it was soaked in air at 1 atmosphere for 12 hours at 1100° F., and was returned to the hydroforming operation. The results are given in the following table and are plotted as curve 3 in Figure 4, where it will be observed that the downward trend of the catalyst activity was not visibly altered by the described treatment.

Product interval:         Octane No., CFR–R
    0–5 hours ................................... 90.5
    5–20 hours .................................. 90.3
    20–35 hours ................................ 90.5
    35–50 hours ................................ 89.3
    50–65 hours ................................ 87.2
    65–80 hours ................................ 88.2
    80–95 hours ................................ 88.0

At the end of the foregoing test, the flow of naphtha was stopped and the flow of hydrogen at 200 pounds per square inch gage was continued for 0.5 hour. The reactor was then depressured, purged with 50 liters of nitrogen, and repressured to 200 pounds per square inch gage. Air was introduced at 200 pounds per square inch gage and 965° F. block temperature at such a rate (approximately 15 liters per hour) as to produce a 1080° F. combustion-front temperature. After passage of the combustion front, the air flow was continued for 22 hours at the rate of approximately 10 liters per hour, the block temperature being raised to 1080° F. during the last 16 hours. The reactor was cooled to 965° F. in air at 200 pounds per square inch gage, depressured, purged with nitrogen, repressured with hydrogen to 200 pounds per square inch gage, and held at 965° F. for 0.5 hour, after which the hydroforming operation was resumed. The results are given in the following table and are plotted as curve 4 in Figure 4. It is apparent that this treatment of the catalyst in situ effected a gross deactivation thereof.

Product interval: Octane No., CFR-R
0-5 hours _____ 62.7
5-20 hours _____ 55.9
20-35 hours _____ 59.4
35-50 hours _____ 59.4
50-65 hours _____ 60.8
65-80 hours _____ 64.2
80-95 hours _____ 62.7

After the foregoing test had been completed, the catalyst was purged and removed from the reactor for another oxygen treatment, performed outside of the reactor in an effort to avoid any impurities accumulated therein. The catalyst was soaked for six hours in air at one atmosphere and 825° F. in a ceramic tube, and was soaked for twelve additional hours in air at one atmosphere and 1100° F. A hydroforming test under the usual conditions indicated (curve 5, Figure 4) that the catalyst had been improved to some extent, but was still far below its original activity.

Product interval: Octane No., CFR-R
0-5 hours _____ 73.8
5-25 hours _____ 77.1

The catalyst was subsequently treated in the reactor with a stream of air at 200 pounds per square inch gage, 965° F. block temperature, and 1050° F. combustion-front temperature for 0.5 hour; then it was exposed to a stream of hydrogen at a block temperature of 1050° F. and a pressure of 200 pounds per square inch gage for 16 hours; and finally it was soaked in a stream of air at 200 pounds per square inch gage and a block temperature of 1080° F. for a period of 16 hours. A typical hydroforming test (curve 6, Figure 4), employing naphtha without added $H_2S$, showed that the catalyst had been restored to an activity approaching its original level.

Product interval: Octane No., CFR-R
0-5 hours _____ 94.3
5-25 hours _____ 93.1
25-45 hours _____ 92.5
45-65 hours _____ 92.8

*Example 3*

Another series of tests were carried out in a temperature-gradient reactor, simulating operation under adiabatic conditions. The reactor was a 1.5-inch Schedule 80 stainless-steel pipe, approximately 48 inches long, into which were charged approximately 400 milliliters of catalyst, occupying two zones 5⅛ inches and 6⅝ inches in length, separated by a 7¾ inch reheat zone filled with ⅛-inch alumina pellets. The reactor pipe was heated by electrical resistance wiring, so spaced as to maintain a temperature drop of approximately 100° F. from the inlet to the exit of each catalyst zone. The catalyst was ⅛-inch pellets of 0.6 percent by weight platinum on Heard-type alumina.

As a basis for comparison, an initial activity test was carried out in which a Mid-Continent virgin heavy naphtha that was hydroformed at 300 pounds per square inch gage, 950° F. inlet temperature, 850° F. outlet temperature, 1.5 weight hourly space velocity, and 5,000 cubic feet of recycle hydrogen-containing gas per barrel of feed. The following results were obtained:

| Product Interval | Observed Octane No., CFR-R | Observed Yield, C₅-400° F., vol.-Percent |
|---|---|---|
| 4-20 hours | 93.2 | 80.1 |
| 20-36 hours | 94.2 | 78.3 |
| 36-52 hours | 92.8 | 78.5 |
| 52-68 hours | 92.2 | 78.5 |
| 68-84 hours | 91.4 | 73.1 |

At the end of the activity test, the catalyst was purged, carbon was burned therefrom with 2 percent oxygen in nitrogen at a 950° F. combustion front temperature, and the catalyst was rejuvenated by soaking in air at 300 pounds per square inch gage and 950° F. for 8 hours. In a subsequent activity test, a charging stock consisting of the 72 percent highest boiling distillation cuts from El Dorado mixed naphtha was hydroformed under the conditions employed in the initial activity test, with the following results:

| Product Interval | Observed Octane No., CFR-R | Observed Yield, C₅-400° F., vol.-Percent |
|---|---|---|
| 4-20 hours | 92.5 | 75.4 |
| 20-36 hours | 91.0 | 75.6 |
| 36-52 hours | | |
| 52-68 hours | 91.0 | 76.3 |

After the above test had been completed, the catalyst was successively treated with a stream of hydrogen for 12 hours at 935° F. and 300 pounds per square inch gage, purged with nitrogen, regenerated by carbon burn-off with 2.7 percent oxygen in nitrogen at 950° F. combustion front and 300 pounds per square inch for two hours, treated with a stream of hydrogen at 900° F. and 300 pounds per square inch gage for four hours, and finally contacted with a stream of air at 1000° F. and 300 pounds per square inch gage for eight hours. Immediately thereafter, a new hydroforming test was carried out on a full-range El Dorado mixed naphtha, having an initial boiling point of 97° F., an end point of 347° F., and a sulfur content of 0.02 percent. The results were as follows:

| Product Interval | Observed Octane No., CFR-R | Observed Yield, C₅-400° F., vol.-Percent |
|---|---|---|
| 4-20 hours | 90.6 | 70.8 |
| 20-36 hours | 89.6 | 73.4 |
| 36-52 hours | 89.0 | 73.9 |
| 52-68 hours | 87.8 | 77.4 |

At the end of the foregoing test, the carbon burnoff, hydrogen treatment, and air treatment were repeated, duplicating the rejuvenation conditions employed immediately preceding the said test, and a new activity test was carried out on Mid-Continent virgin heavy naphtha, duplicating the conditions employed in the initial activity test. The results were as follows, demonstrating that the catalyst had been rejuvenated to better than its initial condition of activity, selectivity, and stability:

| Product Interval | Observed Octane No., CFR-R | Observed Yield, C₅-400° F., vol.-Percent |
|---|---|---|
| 0-18 hours | | |
| 18-50 hours | 94.6 | 81.3 |
| 50-82 hours | 93.9 | 78.7 |
| 82-98 hours | 92.8 | 82.4 |
| 98-114 hours | 93.6 | 79.3 |
| 114-130 hours | 94.7 | 81.8 |

While we have described our invention in connection with the reactivation of fixed-bed and fluidized catalysts, it is obviously applicable also to the treatment of other forms of catalysts, employed in other types of catalytic apparatus. For example, the catalyst can be used in the form of a moving bed, or in the form of a powder slurried in the charging stock in the so-called suspensoid process. Other alternatives and modified techniques will be apparent to those skilled in the art. In general it can be said that any modifications or equivalents that would ordinarily occur to one skilled in the art are to be considered as lying within the scope of our invention.

In accordance with the foregoing description, we claim as our invention:

1. The method of restoring the catalytic properties of a platinum-on-alumina catalyst which has become deactivated and which has accumulated carbonaceous, sulfur-containing deposits during on stream use in the hydroforming of naphtha, which method comprises burning combustible deposits from the catalyst with an oxygen-containing gas stream at a combustion zone temperature in the range of 825 to 1300° F. for a time sufficient to burn most of the carbonaceous deposits from the catalyst and to oxidize sulfur contained therein whereby the catalyst is sulfur-deactivated, purging oxygen from the catalyst with an inert gas, then treating said sulfur-deactivated catalyst with hydrogen at a temperature in the range of 650 to 1300° F. until the evolution of sulfur compounds from the catalyst substantially ceases, purging the hydrogen and liberated sulfur compounds from the catalyst, and then contacting the catalyst with a gas containing free oxygen and having an oxygen partial pressure in the range of about .4 to 4 atmospheres at a temperature in the range of about 900 to 1100° F. for a period of time sufficient to restore said catalyst substantially to its initial levels of activity, selectivity and stability.

2. The method of claim 1 wherein the oxygen contacting step is effected at a superatmospheric pressure of at least about 50 p. s. i.

3. The method of claim 1 wherein the hydrogen treating step is effected at a temperature in the range of about 850 to 1100° F.

4. The method of claim 1 wherein the hydrogen treating step is effected at a pressure between about 50 and 1000 p. s. i. g. at a temperature in the range of 850 to 1100° F.

5. The method of claim 1 wherein the catalyst is treated with hydrogen and purged with an inert gas prior to the initial combustion of carbonaceous deposits and wherein the catalyst after the final oxygen contacting step is purged and again treated with hydrogen before going back on stream for effecting the hydroforming of naphtha.

6. A regenerative process for reforming a sulfur-containing naphtha which comprises contacting vapors of said naphtha in the presence of free hydrogen under a pressure in the range of 50 to 350 p. s. i. at a temperature in the range of about 850 to 1000° F. with a catalyst comprising alumina containing about .1 to 1 percent of platinum and prepared by commingling aqueous chloroplatinic acid and ammonium polysulfide with an alumina hydrosol, drying and calcining, which catalyst under such conditions becomes deactivated and accumulates carbonaceous and sulfurous deposits, periodically taking the catalyst off stream, treating the catalyst with hydrogen, purging the catalyst to remove hydrogen therefrom, burning combustible deposits from the catalyst with an oxygen-containing gas stream at a combustion zone temperature in the range of about 825 to 1300° F. for a time sufficient to burn most of the carbonaceous deposits from the catalyst and to oxidize sulfur contained therein whereby the catalyst is sulfur deactivated, purging oxygen from the catalyst with an inert gas, then treating the sulfur deactivated catalyst with hydrogen at a temperature in the range of 650 to 1300° F. until evolution of sulfur compounds from the catalyst substantially ceases, purging the hydrogen and liberated sulfur compounds from the catalyst, then contacting the catalyst with a gas containing free oxygen and having an oxygen partial pressure in the range of about .4 to 4 atmospheres at a temperature in the range of about 900 to 1100° F. for a period of time sufficient to restore said catalyst substantially to its initial levels of activity, selectivity and stability, purging oxygen from the catalyst, contacting the catalyst with hydrogen under substantially on stream conditions of temperature and pressure and repeating the defined sequence of steps.

References Cited in the file of this patent
UNITED STATES PATENTS

| | | |
|---|---|---|
| 2,273,864 | Houdry | Feb. 24, 1942 |
| 2,459,480 | Welty et al. | Jan. 18, 1949 |
| 2,479,110 | Haensel | Aug. 16, 1949 |
| 2,641,582 | Haensel | June 9, 1953 |
| 2,662,861 | Riblett et al. | Dec. 15, 1953 |
| 2,664,404 | Blatz et al. | Dec. 29, 1953 |